United States Patent [19]

Moody

[11] 4,256,477

[45] Mar. 17, 1981

[54] CLASS FIBER FORMING

[75] Inventor: Howard B. Moody, Newark, Ohio

[73] Assignee: Owens-Corning Fiberglas Corporation, Toledo, Ohio

[21] Appl. No.: 103,783

[22] Filed: Dec. 14, 1979

[51] Int. Cl.³ .............................................. C03B 37/02
[52] U.S. Cl. ............................................ 65/2; 65/12; 65/29; 65/162
[58] Field of Search .................. 65/1, 2, 11 W, 12, 29, 65/162

[56] References Cited

U.S. PATENT DOCUMENTS

| | | | |
|---|---|---|---|
| 3,649,231 | 3/1972 | Trethewey | 65/2 |
| 3,986,853 | 10/1976 | Coggin et al. | 65/12 X |
| 4,149,865 | 4/1979 | Coggin | 65/12 X |
| 4,167,403 | 9/1979 | Coggin | 65/1 |

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

Method and apparatus for measuring two or more temperatures of a bushing and controlling those temperatures by introducing a gaseous fluid into contact with the bushing at two or more loci.

13 Claims, 3 Drawing Figures

CLASS FIBER FORMING

BACKGROUND OF THE INVENTION

This invention relates to glass fiber forming.

In one of its more specific aspects, this invention relates to temperature control of the bushings from which glass fibers are drawn.

In the formation of glass fibers, it is conventional to pull glass fibers through the apertures in the bottom of a molten glass container, or bushing. The glass depends from these apertures in the form of inverted cones and the fibers are drawn from these cones. The bushings can have tips, or be tipless.

Recently, it has been found that air introduction into the region of these cones and against the bottom of the bushing results in improved operations. However, it is also known that because of the non-uniform temperature of the molten glass within the bushing, there exists, even with air introduction, undesireably large differences in glass temperature at various zones of the bushing with attendant differences in the properties of the fibers which are drawn from those zones.

This invention is directed towards the solution of that problem.

By employment of the present invention, temperature differences between different loci of the bushing are maintained or eliminated with the result that filaments drawn from these loci are more uniform in properties or are of different properties. This is particularly beneficial when more than one package is formed from filaments drawn from a single bushing.

STATEMENT OF THE INVENTION

According to this invention, there is provided a method for controlling the characteristics of filaments drawn from a bushing which comprises sensing the temperatures of the bottom of the bushing at a plurality of loci, comparing the sensed temperatures to predetermined temperature values and adjusting the flow of a fluid introduced into contact with said loci from at least one of a plurality of fluid introduction means responsive to said sensing to adjust the temperature differentials between said loci and said predetermined temperature.

Also, according to this invention, there is provided in combination with a glass filament-forming bushing and a fluid introduction means for introducing a fluid into contact with said bushing, the improvement comprising temperature sensing means in contact with at least two loci positioned on the bottom of said bushing and control means responsive to said sensing means, said control means being adapted to alter the characteristics of fluid introduced from said fluid introduction means into contact with at least one of said loci.

DESCRIPTION OF THE DRAWINGS

The invention will be more easily understood if explained in conjunction with the attached drawings in which.

Without meaning to limit the invention, the invention will be explained in terms of air being the fluid introduced into contact with the bushing, it being understood that other fluids, both liquid and gaseous, can be employed.

Figures 1, 2:
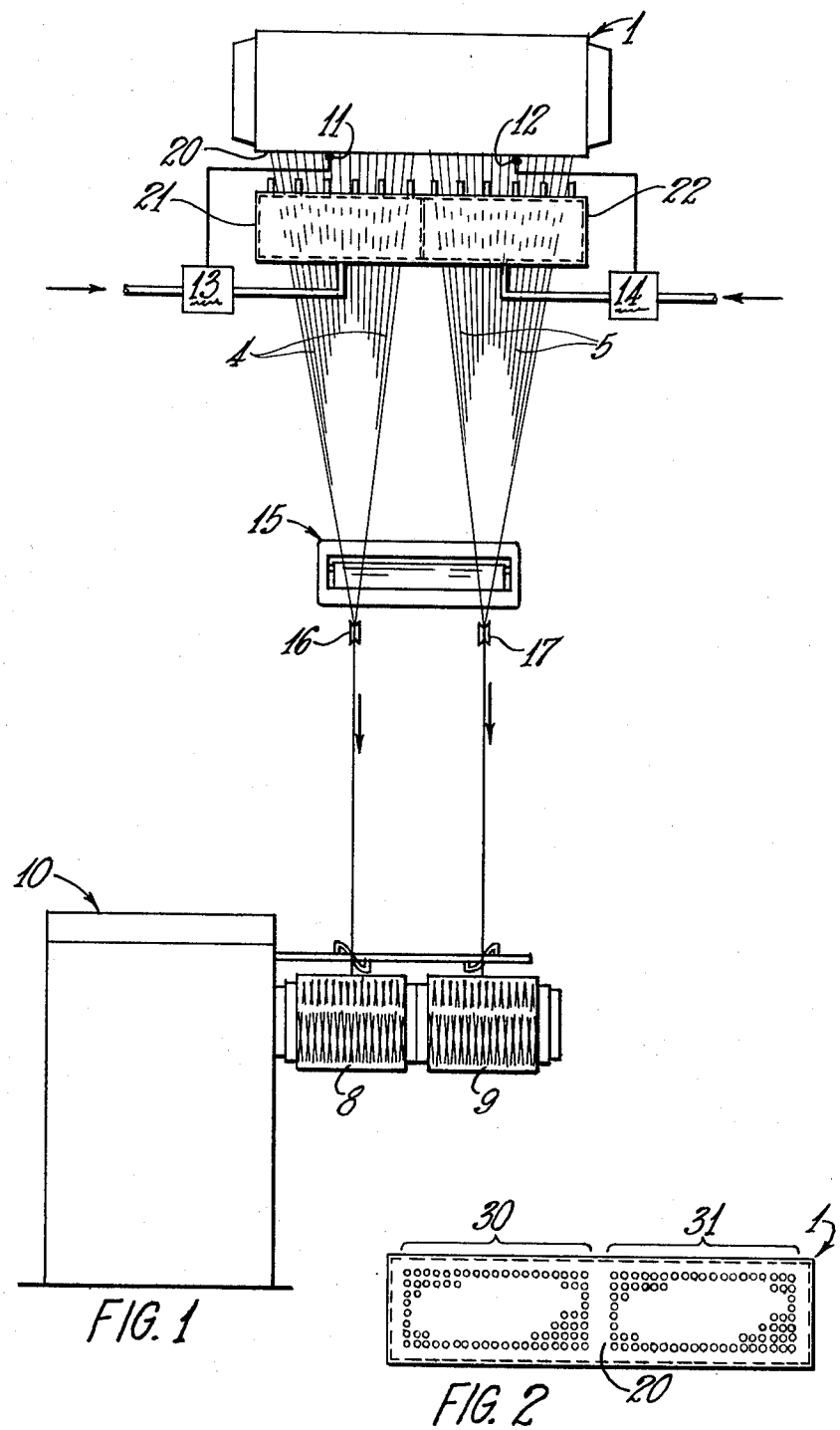
FIG. 1 depicts, in elevation, one embodiment of the invention.
FIG. 2 is a bottom view of a bushing employed in the invention; and, FIG. 3 depicts a bushing and fluid introduction means arrangement according to the invention.

Referring now to FIG. 1, there is illustrated bushing 1 from which a plurality of filaments are pulled as groupings 4 and 5. These filaments are sized at one or more size applicators 15, and gathered into a strand at gathering shoes 16 and 17 and collected as individual packages 8 and 9 on winder 10.

Mounted, preferably on the exterior surface of bottom 20 of the bushing, are two or more thermocouple terminals 11 and 12 which sense the temperature of the bottom plate and transmit these sensed temperatures to control means 13 and 14, respectively, where a comparison is made between one or more preselected temperature values and the sensed values, in the usual manner. By means of the control means, the quantity or quality of the air emitted from nozzles 21 and/or 22 is individually affected in such a manner as to bring the measured temperatures into correspondence with the preselected values.

It will be understood that either like or unlike preselected temperature values can be used such that, as where the filaments are split to form two packages, the packages will have like or unlike characteristics. In the usual operations, the preselected temperatures will be alike.

The bushing employed in the present invention will be of any prior art type. It can consist of a single section with one or more fluid discharges from a plurality of blowers being directed to different portions thereof. Or, the bushing can consist of a plurality of sections with one or more fluid discharges from a plurality of blowers being directed to the different sections. As shown in FIG. 2, the depicted bushing can consist of two areas 30 and 31 into contact with which will be directed at least one fluid discharge.

The blower can be of any suitable type conventional in the art. On particularly suitable blower is that disclosed in U.S. application Ser. No. 951,542, now U.S. Pat. No. 4,202,680 granted May 13, 1980. Any number of blowers can be employed. The blowers can be adapted to discharge variable quantities of gaseous fluid in any suitable manner, for example, with the control altering the intake volume to the blower or the speed of the blower.

Figure 3:
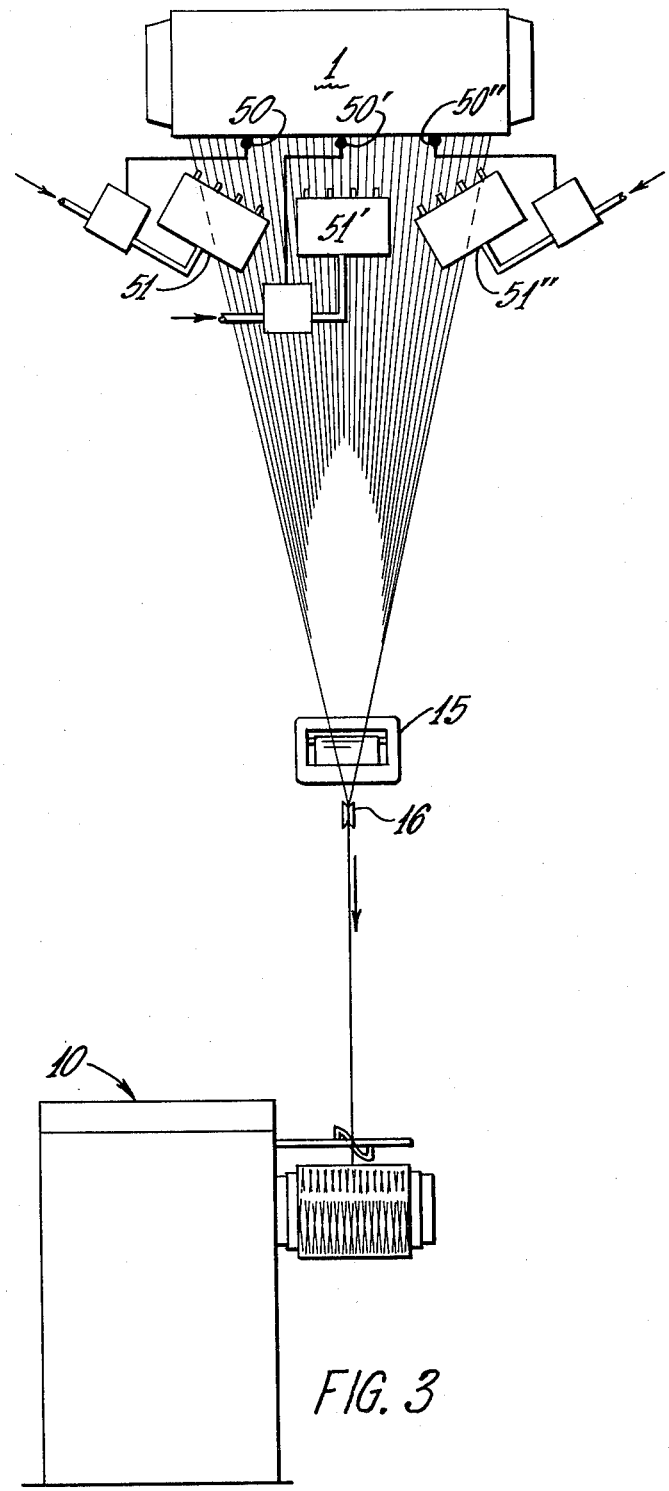

As shown in FIG. 3, preferably one thermocouple 50, 50' and 50" will be positioned relative to each blower, 51, 51' and 51", while the bushing product can be split to produce two or more packages as shown in FIG. 1. As shown in FIG. 3, a plurality of blowers can be positioned such that each discharges against a portion of the bushing with all filaments from the bushing being collected into a single package.

The thermocouples can be positioned at any point on the outer apertured surface of the bushing. Preferably, they will be positioned at a distance from the intersection of the bushing wall and bottom, rather than at the junction therebetween. Depending upon the bushing characteristics as well as the characteristics of the distribution device employed to introduce the molten glass into the bushing, the most advantageous location of the thermocouple terminals can easily be determined by a series of trial placements.

As stated, while the above has been discussed in terms of air, any vaporous fluid can be used. For example, two or more fluids can be used, these fluids being different in specific heat or in temperature, such that, depending upon the temperature alteration to be effected, more or less of one or the other of the fluids can be introduced. Similarly, mixtures of a gaseous fluid and steam can be employed with the quantity of either component of the mixture being varied as necessary to alter the temperature of the bushing. Also, the blowers can be caused to discharge dissimilar gaseous fluids.

It will be evident from the foregoing that various modifications can be made to this invention. Such, however, are considered as being within the scope of the invention.

I claim:

1. A method of controlling the characteristics of filaments drawn from a bushing which comprises:
   a. sensing the temperature of the bottom of the bushing at a plurality of loci;
   b. comparing the sensed temperature values to predetermined values for each of said loci; and
   c. individually adjusting the flow of fluid introduced into contact with each of said loci from at least one of a plurality of fluid introduction means responsive to said sensing to adjust the temperature differentials between said loci and said predetermined temperature values.

2. The method of claim 1 in which said predetermined temperature values are alike.

3. The method of claim 1 in which said predetermined temperature values are unalike.

4. The method of claim 1 in which said filaments are drawn from each of said loci and are combined in a single package.

5. The method of claim 1 in which said filaments are drawn from each of said loci and are combined in a plurality of packages.

6. The method of claim 1 in which said fluid is selected from the group consisting of air and steam.

7. The method of claim 1 in which the flow of fluid to said loci is adjusted by altering the quantity of said fluids.

8. The method of claim 1 in which the flow of fluid to said loci is adjusted by altering the composition of said fluids.

9. The method of claim 1 in which the flow of fluid to all of said loci is altered.

10. In combinations with a glass filament-forming bushing and a fluid introduction means for introducing a fluid into contact with said bushing, the improvement comprising temperature sensing means in contact with at least two loci positioned on the bottom surface of said bushing and control means responsive to each of said sensing means, said control means being adapted to individually alter the characteristics of fluid introduced from said fluid introduction means into contact with at least one of said loci.

11. The combination of claim 10 including a winder.

12. The combination of claim 11 in which said winder is adapted to wind a plurality of packages comprising said filaments.

13. The combination of claim 10 comprising a bushing divided into two zones, each zone being adapted with temperature sensing means and one fluid introduction means.

* * * * *